United States Patent [19]
Santos et al.

[11] Patent Number: 5,711,278
[45] Date of Patent: Jan. 27, 1998

[54] CIRCUIT AND METHOD FOR SYNCHRONIZING A FUEL PUMP OR THE LIKE

[75] Inventors: A. John Santos, Farmington; Mark E. LaCroix, New Hartford, both of Conn.

[73] Assignee: The Torrington Company, Torrington, Conn.

[21] Appl. No.: 608,837

[22] Filed: Feb. 29, 1996

[51] Int. Cl.$^6$ ................................................. F02M 37/04
[52] U.S. Cl. ........................................... 123/501; 123/436
[58] Field of Search ....................................... 123/501, 500, 123/436, 494, 419, 357

[56] References Cited

U.S. PATENT DOCUMENTS

| | | | |
|---|---|---|---|
| 4,493,302 | 1/1985 | Kanamura | 123/501 |
| 4,503,830 | 3/1985 | Nakamura | 123/501 |
| 4,546,749 | 10/1985 | Igashira | 123/494 |
| 4,642,773 | 2/1987 | Miyaki | 123/501 |
| 4,653,454 | 3/1987 | Konishi | 123/494 |
| 4,656,990 | 4/1987 | Miyaki et al. | |
| 4,748,447 | 5/1988 | Oshizawa | |
| 4,757,795 | 7/1988 | Kelly | 123/501 |
| 4,858,158 | 8/1989 | Ishikawa | 123/436 |
| 4,879,985 | 11/1989 | Day et al. | |
| 5,103,792 | 4/1992 | Winkler | 123/494 |
| 5,188,081 | 2/1993 | Birk et al. | |
| 5,561,600 | 10/1996 | McCombie | 123/436 |

Primary Examiner—Carl S. Miller
Attorney, Agent, or Firm—John C. Bigler

[57] ABSTRACT

A sensor senses a reference signal having a reference pulse characterizing angular position of a rotating member and an angular clock pulse characterizing the rotational speed of the rotating member and having an angular clock pulse frequency greater than the reference pulse frequency. An output signal is produced having an output pulse delayed with respect to the reference pulse of the reference signal by an integral number of angular clock pulses to provide a coarse adjustment. The output signal may be delayed by an additional fraction of a subsequent angular clock pulse to provide a fine adjustment. A circuit to effect this method is also disclosed.

15 Claims, 1 Drawing Sheet

CIRCUIT AND METHOD FOR SYNCHRONIZING A FUEL PUMP OR THE LIKE

BACKGROUND OF THE INVENTION

This invention relates generally to devices for adjusting a pump or other device for synchronization with respect to a second device and, more particularly, to a method for synchronizing a fuel injector pump with a diesel engine.

Fuel injection pumps must supply fuel to the individual cylinders of a diesel engine with particular and accurate timing, synchronized with the rotation of the engine, to achieve maximum performance. For that reason, fuel injection pumps are provided with various mechanical and electrical systems for controlling fuel injection timing.

Common control systems for fuel injection pumps employ pulse wheels located on the crank shaft, camshaft or other rotating member to control the quantity of fuel injected to a particular cylinder and to control the start of fuel injection. A reference pulse mark may be used to establish the beginning of fuel injection. Similarly, speed pulses may be used to determine average and rotational speeds, and a synchronizing pulse may be used to assign the pumped fuel to a predetermined cylinder.

In one such control system, a sensor for detecting the position of a camshaft of the fuel pump must be precisely positioned along a circumference of the fuel pump over a range of 5.0 degrees in order to synchronize the fuel pump with the engine. Each fuel pump must be adjusted individually as a final manufacturing step, increasing the cost of the fuel pump. Additional parts and several machining operations add to the cost.

The foregoing illustrates limitations known to exist in present devices and methods. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the present invention, this is accomplished by providing a method for modifying a reference signal having a reference pulse characterizing angular position of a rotating member. An angular clock pulse characterizing the rotational speed of the rotating member and having an angular clock pulse frequency greater than the reference pulse frequency is sensed. Then, an output signal is produced having an output pulse delayed with respect to the reference pulse of the reference signal by an integral number of angular clock pulses to provide a coarse adjustment.

In another aspect of the present invention, this is accomplished by providing a circuit for modifying a reference signal having a reference pulse characterizing the angular position of the rotating member and an angular clock signal having an angular clock pulse characterizing the speed of rotation of the rotating member. The circuit comprises sensing means for sensing the reference signal and the angular clock signal and first delay means for producing an output signal having an output pulse delayed with respect to the reference pulse by an integral number of angular clock pulses to provide a coarse adjustment.

The foregoing and other aspects will become apparent from the following detailed description of the invention when considered in conjunction with the accompanying drawing figures.

BRIEF DESCRIPTION OF THE DRAWING FIGURES

FIG. 1 is a block diagram illustrating the electronic circuit for modifying a reference signal according to the present invention; and FIG. 2 is a time chart illustrating the relationship between a reference signal, an angular clock pulse signal and an output signal.

DETAILED DESCRIPTION

Figure 1:
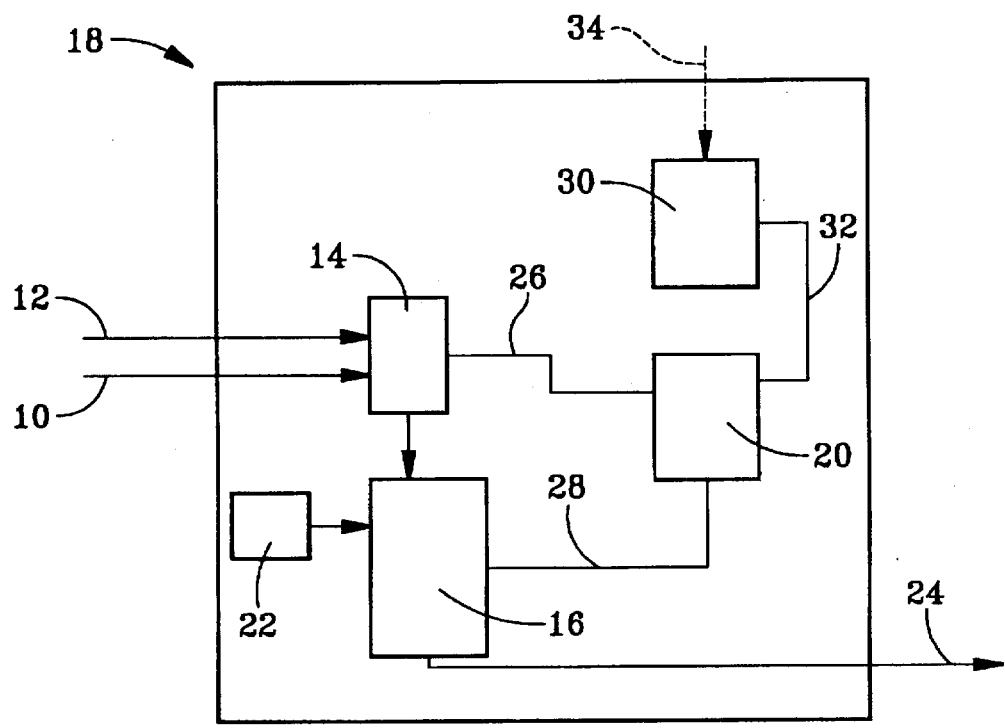

Referring now to the drawings, reference signal 10, with a reference pulse characterizing the angular position of a rotating member, and angular clock signal 12 are applied to coarse delay segment 14 and fine delay segment 16 of circuit 18 as shown in the block diagram of FIG. 1. Angular clock signal 12 characterizes the speed of rotation of the rotating member and has an angular clock pulse with an angular clock pulse frequency greater than the frequency of the reference pulse.

Electronic module 20 may have various forms to control coarse delay segment 14 such that the reference pulse is delayed an integral number of angular clock pulses and to control fine delay segment 16 such that the reference pulse is delayed an additional fractional number of angular clock pulses. For example, electronic module 20 may comprise a computer memory or a series of switches arranged to provide a binary number that is periodically loaded into a down counter that counts down to zero.

In the embodiment shown, reference signal 10 has 8 pulses (rising edges) for each revolution of the rotating member, evenly spaced at 45 degrees. One of the 8 reference pulses is 9 degrees in duration, to indicate cylinder No. 1, and the other reference pulses are 3 degrees in duration, to indicate the other 7 cylinders of an 8 cylinder engine. Similarly, angular clock signal 12 has 512 pulses (rising edges) for each revolution of the rotating member, equally spaced, thereby providing intervals of 0.703125 degrees. The locations of the angular clock pulses with respect to the reference pulses and with respect to the rotating member are not critical.

Fine delay segment 16 uses time to approximate 16 angular positions between angular clock pulses. Time clock pulses of high speed oscillator 22 are counted by an "up counter" to measure time between consecutive angular clock pulses. That measured number of time clock pulses is then used to load a "down counter" that counts down to zero at a rate 16 times faster than the counting rate of the up counter. Because the speed of rotation of the rotating member changes little over 0.703125 degrees, the down counter reaches zero when the rotating member has rotated approximately 1/16 of the angular distance to the next angular clock pulse. By loading the high speed down counter from zero to 15 times, an angular delay of increments of 1/16 of an angular clock pulse is provided.

In this embodiment, electronic module 20 may be a series of switches controlled by program segment 30 to select and permanently set a delay of output signal 24 with respect to the reference pulse. For example, three switches, providing a binary code count from zero to 7, may be joined to coarse delay segment 14 by 3-wire bus 26, to select a desired delay from zero to 7 whole angular clock pulses. Similarly, four switches, providing a binary code count from zero to 15, may be joined to fine delay segment 16 by 4-wire bus 28, to select a desired delay from 0/16 to 15/16 of an angular clock pulse.

Program segment 30, joined to electronic module 20 by electrical connection 32 and having optional input 34, may include logic to sequentially advance the switches of electronic module 20 to provide a progressive delay of the reference pulse until delayed output signal 24 matches a desired delay. In such case the switches controlling coarse delay segment 14 and fine delay segment 16 may be linked to advance the coarse delay an angular clock pulse when the fine delay is reset to zero. Alternatively, program segment 30 may compute the required switch positions and permanently set the switch positions or temporarily set the switch positions subject to further adjustment.

To replace the mechanical adjustment of a fuel injection pump, as described above, the sensor is mounted in a position assuring that reference signal 10 will be sufficiently "advanced" regardless of the manufacturing variations of the fuel injection pump components. In the described embodiment, the sensor is mounted 0.703125 degrees earlier in the rotation of the rotating member such that a preceding angular clock pulse can be measured in time clock pulses in order to provide a maximum delay of the reference pulse of at least 5 degrees. The delay may be selected to be zero to 8 angular clock pulses (5.625 degrees), in increments of 0.0439 degrees.

Figure 2:
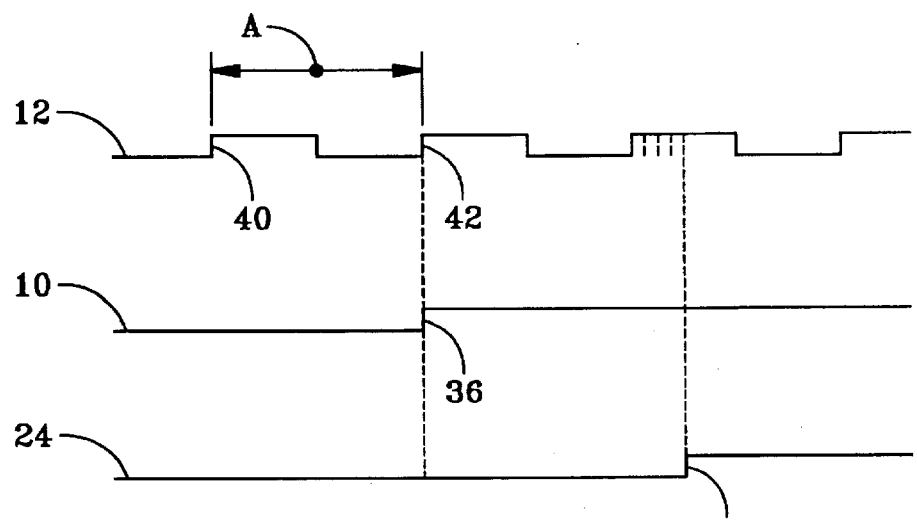

As illustrated in the time charts of FIG. 2, reference signal 10 has reference pulse 36 in advance of desired output pulse 38. Angular clock signal 12 has a frequency greater than the reference pulse frequency and need not have an angular clock pulse coinciding with reference pulse 36. Period "A" between preceding consecutive angular clock pulses 40 and 42 is divided into 16 equal segments by counting time clock pulses as described above. Reference pulse 36 is then delayed an integral number of angular clock pulses and an integral number of segments 1/16 of an angular pulse such that the corresponding pulse of output signal 24 coincides with desired output pulse 38. In the particular example shown in FIG. 2, the required delay is one angular clock pulse and 4 segments having a duration 1/16 of an angular pulse.

From the above description, it will be apparent that the present invention allows a sensor to be permanently affixed to a fuel injection pump at a single point without provision for physical adjustment of the sensor along a circumference of the fuel injection pump. The reference signal from the sensor can then be adjusted electronically and permanently set so that the fuel injection pump will be synchronized with an engine on which it is subsequently installed. This electronic adjustment can be automated to further reduce the cost of the adjusted fuel injection pump. The sensor may variously sense an optical encoder, tone wheel, magnetic encoder or other device to generate the reference signal and angular clock signal.

Although the present invention has particular advantages with fuel injection pumps, it may also be used in electronic ignition systems and many other applications requiring coordination of a machine or activity with respect to a rotating member. The number of clock pulses per revolution (512), the number of reference pulses per revolution (8), the counted pulses of the coarse delay segment (8), and the divisions effected by the fine delay segment (16) are only illustrative.

Having described the invention, what is claimed is:

1. A method for electronically synchronizing a fuel injector pump with respect to an engine having a rotating member, the method comprising:

sensing a reference signal having a reference pulse characterizing an angular position of the rotating member, the reference pulse having a reference pulse angular frequency;

sensing an angular clock signal having an angular clock pulse characterizing the speed of rotation of the rotating member and having an angular clock pulse angular frequency greater than the reference pulse frequency; and producing an output signal having a output pulse shifted angularly with respect to the reference pulse of the reference signal by an integral number of angular clock pulses to provide a coarse adjustment.

2. The method according to claim 1, further comprising the step of angularly shifting the output pulse of the output signal an additional fraction of an angular clock pulse to provide a fine adjustment.

3. The method according to claim 2, wherein the fine adjustment is provided by measuring time between two consecutive angular clock pulses as a counted number of pulses of a time clock signal and delaying the output pulse a portion of the counted number of time clock pulses.

4. The method according to claim 2, further comprising the step of comparing the reference pulse to a desired output pulse to determine a preferred amount of delay of the output pulse with respect to the reference pulse.

5. A method for modifying a reference signal, the reference signal having a reference pulse characterizing angular position of a rotating member, the circuit comprising:

sensing an angular clock pulse characterizing the rotational speed of the rotating member and having an angular clock pulse angular frequency greater than the reference pulse angular frequency; and producing an output signal having an output pulse shifted angularly with respect to the reference pulse of the reference signal by an integral number of angular clock pulses to provide a coarse adjustment.

6. The method according to claim 5, further comprising the step of angularly shifting the output pulse of the output signal an additional fraction of an angular clock pulse to provide a fine adjustment.

7. The method according to claim 6, wherein the fine adjustment is provided by measuring time between two consecutive angular clock pulses as a counted number of pulses of a time clock signal and delaying the output pulse a portion of the counted number of time clock pulses.

8. The method according to claim 6, further comprising the step of comparing the reference pulse to a desired output pulse to determine a preferred amount of delay of the output pulse with respect to the reference pulse.

9. The method according to claim 8, wherein the preferred amount of delay is effected by a combination of the coarse adjustment and the fine adjustment.

10. A circuit for modifying a reference signal having a reference pulse characterizing the angular position of a rotating member and an angular clock signal having an angular clock pulse characterizing the speed of rotation of the rotating member and having an angular clock pulse angular frequency greater than the reference pulse angular frequency, the circuit comprising:

sensing means for sensing the reference signal and the angular clock signal; and first delay means for producing an output signal having an output pulse shifted angularly with respect to the reference pulse by an integral number of angular clock pulses to provide a coarse adjustment.

11. The circuit according to claim 10, further comprising second delay means for producing an output signal shifted angularly with respect to the output signal of the first delay means by an additional fraction of an angular clock pulse to provide a fine adjustment.

12. The circuit according to claim 10, wherein the second delay means comprises time clock means for measuring time between two consecutive angular clock pulses as a counted number of pulses of a time clock signal, dividing means for dividing the counted number of time clock pulses into shorter time increments, and selecting means for selecting an integral number of the shorter time increments to provide the fractional portion of the counted number of time clock pulses.

13. The circuit according to claim 10, wherein the second delay means comprises time clock means for measuring time between two consecutive angular clock pulses as a counted number of pulses of a time clock signal, a high speed counter means for counting the counted number of pulses at a counting rate faster than the rate of the time clock pulses, and reloading means for reloading the high speed counter a predetermined number of times to provide the fine adjustment.

14. The circuit according to claim 13, further comprising control means and wherein the counting rate of the high speed counter means is 16 times faster than the rate of the time clock pulses, the reloading means being controlled by the control means to reload the high speed counter means from zero to 15 times.

15. The circuit according to claim 10, wherein the angular clock pulse frequency is 512 pulses per revolution of the rotating member.

* * * * *